Patented June 17, 1947

2,422,590

UNITED STATES PATENT OFFICE 2,422,590

PRODUCTION OF FLUORINE

Walter C. Schumb, Milton, and Arthur J. Stevens, Holliston, Mass., assignors, by mesne assignments, to United States of America, as represented by the Director, Office of Scientific Research and Development No Drawing. Application January 21, 1943, Serial No. 473,090

6 Claims. (Cl. 204—60)

The present invention relates to the production of fluorine, and more particularly to improvements in the generation of fluorine gas by electrolytic methods.

While methods for the electrolytic production of fluorine have long been known, these methods have each possessed disadvantages that have prevented any large scale production of fluorine. The difficulties are due in large part to the fact that hydrogen fluoride, from which the fluorine is derived by electrolytic decomposition, is substantially non-conductive. To render the hydrogen fluoride sufficiently conductive to permit electrolysis to take place, it is common practice to add a metal fluoride, for example, potassium bifluoride, $KHF_2$, since this latter material is readily available. By dissolving the potassium bifluoride in liquid anhydrous hydrogen fluoride, an electrolyte is formed from which hydrogen and fluorine are evolved upon passage of an electric current therethrough.

The composition of the electrolyte has a marked effect on the conditions under which the process is carried out, both in respect to temperatures and on the electrodes employed. For example, if the bath is of the approximate molar composition $KF.8HF$, the electrolyte is liquid at room temperature, so that no added heat is necessary under ordinary conditions to maintain the electrolyte fluid. Due, however, to the great excess of hydrogen fluoride, it is necessary to employ an anode of nickel, which is however rapidly eaten away, and must be replaced frequently, making the method a costly one. Furthermore, the fluorides resulting from the corrosion of the nickel cause the bath to sludge, requiring that the cell be dismantled and cleaned at frequent intervals.

If, on the other hand, the composition of the bath is altered by reducing the molar proportion of hydrogen fluoride below that represented by $KF.2HF$, the melting point increases rapidly, a bath of the composition $KF.HF$ melting at approximately 220° C. The use of such a bath requires, for any appreciable scale of production, large amounts of energy in the form of heat. With a bath of this composition, however, it becomes practical to employ an anode of inert material, such as carbon or graphite, thus avoiding the expense of the rapidly consumed nickel anode required by the low temperature bath.

The present invention has as an object improvements in the electrolytic production of fluorine, so as to do away with the need for large amounts of heat without requiring the use of an electrode of nickel or other rapidly consumed expensive material.

More specifically, it is our object to provide an electrolyte for the production of fluorine gas by the electrolytic decomposition of hydrogen fluoride, which electrolyte will permit operation at bath temperatures below 100° C., yet is operable at high current efficiencies with an anode of carbon or other inert material and with low loss of hydrogen fluoride by vaporization from the electrolyte, even at relatively high current densities.

These desirable objects have been achieved through the discovery by us of the beneficial results that arise when relatively small amounts of lithium fluoride are added to electrolytes of the type comprising hydrogen fluoride and a fluoride of a univalent metal, such as an alkali metal as represented by potassium. The primary effect of the lithium fluoride when added to an electrolyte having but a small amount of excess hydrogen fluoride, such as represented by the composition $KF.(1.2$ to $2)HF$ is to lower the melting point to a marked degree. It likewise becomes possible to employ an anode of graphite or of ungraphitized carbon at relatively low bath temperatures. A further desirable result appears as a lowering of the vapor pressure of the hydrogen fluoride, thus reducing the amount of hydrogen fluoride that is evolved and required to be recovered, and consequently permitting increased current densities. With the improved electrolyte as hereinafter more fully described, it becomes for the first time entirely practical to operate a fluorine generator at temperatures below 100° C. while employing a carbon anode, with current efficiencies of 90% and over, with high current densities, and with relatively small sludging over considerable periods of time.

It has been found that relatively small amounts of lithium fluoride serve to bring about the desired result. Amounts of 10% or less have proved highly effective. As an example of a specific composition of electrolyte, one found to operate satisfactorily consisted of the following:

| | Per cent by weight |
|---|---|
| Potassium bifluoride ($KHF_2$) | 81.7 |
| Hydrogen fluoride (HF) | 14.3 |
| Lithium fluoride (LiF) | 4 |

Another way of expressing this composition is in terms of the amount of hydrogen fluoride in relation to the other fluorides, since such ratio gives a general idea of what the melting point of the electrolyte would be in the absence of the lithium fluoride.

So expressed, the relation becomes approximately $MF.1.5HF$ where MF represents lithium fluoride and potassium fluoride together, or in case the fluoride of other univalent metals are present, then MF represents the sum total of such fluorides together with the potassium fluoride and lithium fluoride. In general, the lithium fluoride constitutes up to 10% of the total electrolyte. In comparison with the composition $KF.HF$ already referred to as having a melting point in the vicinity of 220° C., the electrolyte containing lithium fluoride melts at temperatures well below 100° C. Since no increase in the amount of hydrogen fluoride has been required for this lowered melting point, the use of a carbon anode has not been prevented.

For the purpose of indicating generally certain ranges of composition of the improved electrolyte, and not by way of limiting the invention, we consider the following expressions to represent satisfactory ranges:

|  | Per cent by weight |
|---|---|
| Potassium bifluoride ($KHF_2$) | 70–90 |
| Hydrogen fluoride (liquid anhydrous HF) | 8–20 |
| Lithium fluoride | up to 10 |

Having thus indicated the nature of the invention as involving the use of lithium fluoride in markedly improving the production of fluorine by electrolytic decomposition of hydrogen fluoride, and having set forth by way of example certain compositions and ranges thereof found effective in producing the desired results, we claim:

1. An electrolyte for the production of elemental fluorine consisting of about 81.7% by weight of potassium bi-fluoride, about 14.3% by weight of hydrogen fluoride and about 4% by weight of lithium fluoride.

2. In a process for the electrolytic production of elemental fluorine involving passing an electric current between electrodes, the anode being composed of carbon, the improvement comprising employing an electrolyte comprising essentially potassium fluoride, lithium fluoride and hydrogen fluoride, the molar ratio of hydrogen fluoride to potassium fluoride being between about 1.2 to 1 and about 2 to 1, and the lithium fluoride being present in an amount between about 4 and about 10% by weight of the total electrolyte.

3. A process as in claim 2 wherein the electrolyte contains about 4% by weight of the total electrolyte of lithium fluoride.

4. In a process for the electrolytic production of elemental fluorine involving passing an electric current between electrodes, the anode being composed of carbon, the improvement comprising employing an electrolyte comprising essentially about 81.7% by weight of potassium bifluoride, about 14.3% by weight of hydrogen fluoride and about 4% by weight of lithium fluoride.

5. An electrolyte for the electrolytic production of elemental fluorine comprising essentially potassium fluoride, lithium fluoride and hydrogen fluoride, the hydrogen fluoride to potassium fluoride molar ratio being between about 1.2 to 1 and about 2 to 1 and the lithium fluoride being present in an amount between about 4% and about 10% by weight of the total electrolyte.

6. An electrolyte for the electrolytic production of elemental fluorine comprising essentially potassium fluoride, lithium fluoride and hydrogen fluoride, the hydrogen fluoride to potassium fluoride molar ratio being between about 1.2 to 1 and about 2 to 1, the lithium fluoride constituting about 4% by weight of the total electrolyte.

WALTER C. SCHUMB.
ARTHUR J. STEVENS.

REFERENCES CITED

The following references are of record in the file of this patent:

UNITED STATES PATENTS

| Number | Name | Date |
|---|---|---|
| 1,484,734 | Mathers et al. | Feb. 26, 1924 |

FOREIGN PATENTS

| Number | Country | Date |
|---|---|---|
| 619,602 | France | Jan. 4, 1927 |
| 493,873 | Germany | Mar. 20, 1930 |

OTHER REFERENCES

Transactions, American Electrochemical Society, vol. 66, pages 245–252. 1934.